United States Patent
Yoshiwara

(10) Patent No.: US 12,146,588 B2
(45) Date of Patent: Nov. 19, 2024

(54) FLOW RATE CONTROL VALVE

(71) Applicant: SMC CORPORATION, Chiyoda-ku (JP)

(72) Inventor: Masahiko Yoshiwara, Toride (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 18/006,930

(22) PCT Filed: Jul. 12, 2021

(86) PCT No.: PCT/JP2021/026056
§ 371 (c)(1),
(2) Date: Jan. 26, 2023

(87) PCT Pub. No.: WO2022/024728
PCT Pub. Date: Feb. 3, 2022

(65) Prior Publication Data
US 2023/0265942 A1     Aug. 24, 2023

(30) Foreign Application Priority Data

Jul. 30, 2020  (JP) ................................ 2020-129543

(51) Int. Cl.
| | |
|---|---|
| *F16K 37/00* | (2006.01) |
| *F16K 31/50* | (2006.01) |
| *F16K 35/02* | (2006.01) |

(52) U.S. Cl.
CPC ........ *F16K 37/0016* (2013.01); *F16K 31/508* (2013.01); *F16K 35/02* (2013.01);
(Continued)

(58) Field of Classification Search
CPC ........ F16K 35/02; F16K 35/00; F16K 35/022; F16K 35/025; F16K 35/027;
(Continued)

(56) References Cited

U.S. PATENT DOCUMENTS 4,157,786 A * 6/1979 Bergquist ................ F23N 5/067
                                                                   251/96
5,037,066 A * 8/1991 Kerger .................. F16K 35/027
                                                                   74/25
(Continued)

FOREIGN PATENT DOCUMENTS

| JP | 2017-48902 A | 3/2017 |
| JP | 6179510 B2 | 8/2017 |
| JP | 2018-204777 A | 12/2018 |

OTHER PUBLICATIONS

International Search Report issued Sep. 21, 2021 in PCT/JP2021/026056, filed on Jul. 12, 2021, 2 pages.

*Primary Examiner* — Atif H Chaudry
(74) *Attorney, Agent, or Firm* — Oblon, McClelland, Maier & Neustadt, L.L.P.

(57) ABSTRACT

A flow rate control valve includes a handle rotatably provided on a first body including a second flow path, a needle valve that adjusts the opening degree of the second flow path in accordance with the rotation of the handle, a scale body rotatably provided in the handle, a shaft portion provided in the handle, where the shaft portion can rotate together with the handle and the needle valve to move the needle valve in the axial direction, a clutch mechanism that can transmit rotation of the shaft portion to the scale body and block the transmission of rotation, and a cam mechanism that causes the shaft portion to move linearly. The clutch mechanism transmits the rotation of the shaft portion to the scale body in accordance with the operation performed by the cam mechanism and blocks the transmission of rotation.

7 Claims, 16 Drawing Sheets

(52) U.S. Cl.
CPC .......... *F16K 35/022* (2013.01); *F16K 35/025* (2013.01); *F16K 35/027* (2013.01); *F16K 37/0058* (2013.01)

(58) Field of Classification Search
CPC .......... F16K 31/508; F16K 1/04; F16K 31/50; F16K 37/0016; F16K 37/0058
See application file for complete search history.

(56) References Cited

U.S. PATENT DOCUMENTS

| | | | | |
|---|---|---|---|---|
| 7,779,861 | B2* | 8/2010 | Nicolini | F16K 37/0008 |
| | | | | 251/227 |
| 8,726,933 | B2* | 5/2014 | Chen | F16K 17/048 |
| | | | | 137/557 |
| 8,833,535 | B2* | 9/2014 | Saito | G01B 3/18 |
| | | | | 192/114 R |
| 9,523,444 | B2* | 12/2016 | Shishido | F16K 1/04 |

* cited by examiner

FLOW RATE CONTROL VALVE

TECHNICAL FIELD

The present invention relates to a flow rate control valve that controls the flow rate of fluid flowing through a flow path formed in a valve body by adjusting the opening degree of the flow path with a needle valve that operates simultaneously with the rotation operation of a handle and, in particular, to a flow rate control valve capable of displaying the amount of rotation operation of a handle, that is, the opening degree of the flow path adjusted by the needle valve.

BACKGROUND ART

Flow rate control valves are small devices that regulate the flow of fluid and control the speed of actuators. For example, flow rate control valves are used in, for example, automatic production lines for assembling mechanical devices, electronic devices, and the like. For example, as illustrated in PTL 1, some flow rate control valves include a needle valve that adjusts the opening degree of a flow path, a rotary handle that operates simultaneously with the needle valve, and a display unit that displays the opening degree of the flow path adjusted by the needle valve, that is, the amount of rotation operation of the handle.

The flow rate control valve described in PTL 1 includes a housing extending in the axial direction and formed in a tubular shape, a tubular chassis attached to one side (the upper side) of the housing in the axial direction of the housing, and a handle having a shape of a one end closed tube. The handle is provided on the upper side with respect to the chassis in a rotatable manner about the axis. Inside the housing, a needle valve is provided in a movable manner in the axial direction and in a rotatable manner about the axis. An upper portion of the needle valve is inserted into a shaft portion disposed in the chassis and extending in the axial direction, and the needle valve and the shaft portion are fitted so as to be fixed to each other around the axis and be movable from each other in the axial direction. In addition, a hole extending downward in the axial direction is provided in the center of the handle, and the shaft portion extending from the upper portion of the chassis is inserted into the hole so as to be fixed to each other around the axis. That is, when the handle is rotated, the shaft portion and the needle valve can be rotated together.

Furthermore, a tubular needle guide is provided in the housing below the shaft portion, and a female thread provided on the inner surface of the needle guide is screwed with a male thread provided on the outer periphery of the needle valve. Therefore, when the handle is rotated, the needle valve moves in the axial direction while rotating relative to the needle guide. The movement of the needle valve in the axial direction adjusts the degree of opening of the flow path provided in the housing and, thus, the flow rate of the fluid flowing through the flow path can be controlled.

In the flow rate control valve described in PTL 1, an annular display ring is provided at a position offset radially outward from the shaft portion on the upper side with respect to the housing, and the central axis of the display ring extends parallel to the central axis of rotation of the shaft portion. A hole is provided inside the display ring so as to penetrate in the axial direction thereof, and the inner surface of the display ring that forms the hole has internal teeth recessed at equal intervals in the circumferential direction. In addition, the shaft portion is inserted into the hole of the display ring, and the side surface of the shaft portion has a mesh portion that can mesh with the internal teeth. The inner diameter of the hole of the display ring is formed larger than the outer shape of the shaft portion, and the shaft portion is positioned close to one side of the hole of the display ring in the radial direction. When the shaft portion makes one rotation, the mesh portion feeds out one internal tooth in the circumferential direction to rotate the display ring at a predetermined rotation angle. Furthermore, the outer peripheral surface of the display ring is provided with scale marks each indicating the degree of opening of the fluid flow path adjusted by the needle valve (the rotation operation amount of the handle), and the chassis facing the outer peripheral surface of the display ring is provided with a display window that enables the scale mark to be visible therethrough.

CITATION LIST

Patent Literature
    PTL 1: Japanese Patent No. 6179510

SUMMARY OF INVENTION

Technical Problem

As described above, in the flow rate control valve disclosed in PTL 1, the central axis of the display ring is provided at a position offset radially outward from the shaft portion, which is coaxially disposed with the handle and the needle valve. For this reason, the chassis that accommodates the display ring must also be formed so as to bulge outward in the radial direction of the shaft portion, which inevitably structurally increases the size of the chassis and, thus, increases the size of the flow rate control valve. However, to save space, users are demanding that such flow rate control valves be made more compact.

Accordingly, it is a technical object of the present invention to provide a more compact flow rate control valve capable of displaying the rotation operation amount of a handle, that is, the degree of opening of a flow path adjusted by a needle valve.

Solution to Problem

To solve the above-described problems, a flow rate control valve according to the present invention includes a body extending in an axial direction, a flow path formed in the body, a handle provided on one side of the body in the axial direction, wherein the handle is supported by the body in a rotatable manner about the axis relative to the body, and a needle valve disposed in the body coaxially with the handle, where the needle valve adjusts an opening degree of the flow path by moving in the axial direction in accordance with a rotation operation amount of the handle. The flow rate control valve is capable of controlling the flow rate of fluid flowing through the flow path in accordance with the rotation operation amount of the handle. The flow rate control valve further includes a scale body supported in a rotatable manner about the axis and having, marked thereon, scale marks each indicating the rotation operation amount of the handle, a scale indicator configured to rotate about the axis always together with the handle and indicate one of the scale marks corresponding to the rotation operation amount of the handle, and a clutch mechanism configured to switch between the scale marks of the scale body indicated by the scale indicator by transmitting rotation of the handle to the scale body or blocking the transmission each time the handle is rotated at a predetermined angle. The clutch mechanism includes an engaging portion and an engaged portion configured to transmit the rotation of the handle to the scale body by engaging with each other so as to rotate the scale indicator and the scale body together about the axis and a clutch drive mechanism configured to disengage the engaging portion from the engaged portion each time the handle is rotated at a predetermined angle so as to enable the scale indicator to rotate about the axis relative to the scale body due to the rotation of the handle and reengage the engaging portion with the engaged portion due to the rotation of the scale indicator relative to the scale body after the scale mark of the scale body indicated by the scale indicator is switched.

In this case, preferably, the clutch drive mechanism includes a cam surface fixedly provided on the body so as to extend annularly about the axis and a cam follower protrusion disposed facing the cam surface so as to rotate about the axis and slide on the cam surface with the rotation of the handle. The cam surface includes a cam protrusion protruding toward the one side of the axial direction and a cam flat portion extending in a flat shape from a bottom of the cam protrusion while facing the one side of the axial direction. The cam follower protrusion and the engaged portion are supported in a rotatable manner and a movable manner in the axial direction always integrally. The engaging portion is fixedly supported with respect to the body, and the clutch drive mechanism disengages the engaging portion from the engaged portion by sliding the cam follower protrusion on the cam protrusion and moving the engaged portion relative to the engaging portion toward the one side of the axial direction each time the handle is rotated at a predetermined angle so as to enable the scale indicator to rotate about the axis relative to the scale body due to the rotation of the handle. In addition, preferably, the clutch drive mechanism includes a spring portion configured to always urge the cam follower protrusion and the engaged portion toward the other side of the axial direction opposite the one side of the axial direction and, after the scale mark of the scale body indicated by the scale indicator is switched, the clutch drive mechanism moves the cam follower protrusion toward the other side of the axial direction through the urging of the spring portion so that the cam follower protrusion is brought into contact with the cam flat portion and reengages the engaged portion with the engaging portion.

Furthermore, preferably, the flow rate control valve further includes a resistive force generating surface fixed to the body so as to extend annularly about the axis. The scale body includes a contact portion in slidable contact with the resistive force generating surface and, when the engaged portion is disengaged from the engaging portion, the rotation of the scale body due to the rotation of the handle is prevented by a resistive force generated by the contact portion in contact with the resistive force generating surface. More preferably, the contact portion includes a locking protrusion protruding outward in the radial direction, and the resistive force generating surface has, formed therein, a plurality of recesses that concave outward in the radial direction at equal intervals around the axis.

Furthermore, preferably, the scale indicator is a scale indicating opening that is open in the handle, and the scale marks marked on the scale body are visible from an outside through the scale indicating opening.

Advantageous Effects of Invention

As described above, according to the present invention, it is possible to provide a more compact flow rate control valve capable of displaying the rotation operation amount of the handle, that is, the degree of opening of the flow path adjusted by a needle valve.

DESCRIPTION OF EMBODIMENTS

Figure 1:
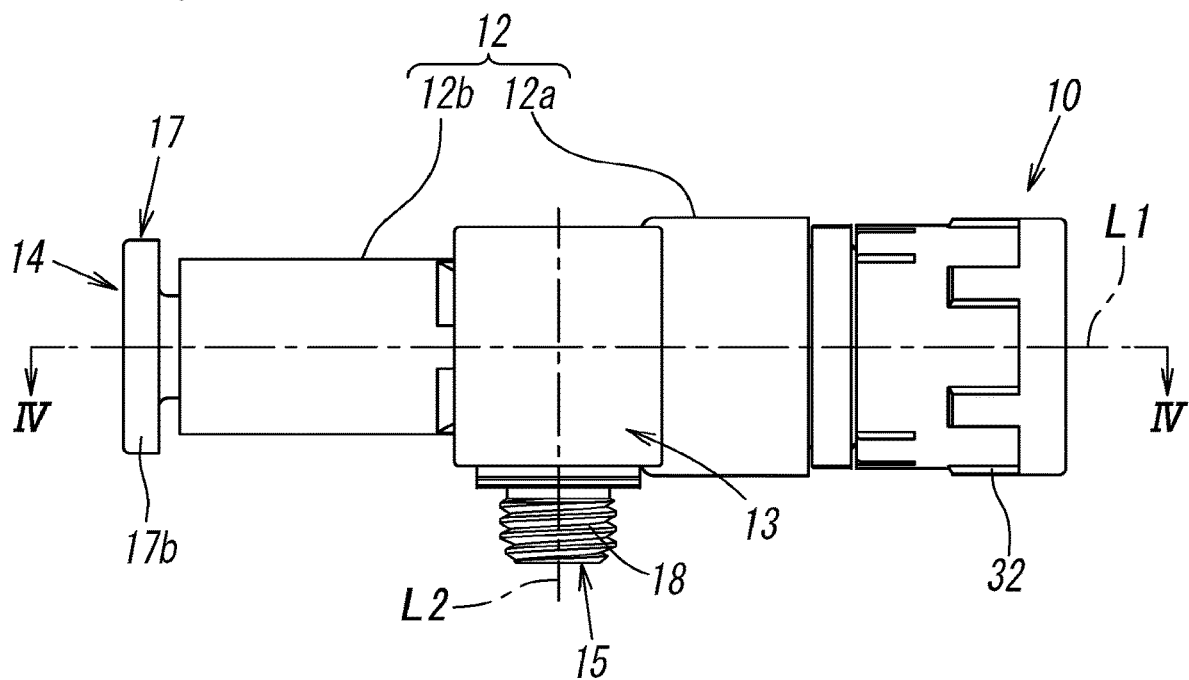
FIG. 1 is a side view illustrating an embodiment of a flow rate control valve according to the present invention.
Figure 2:
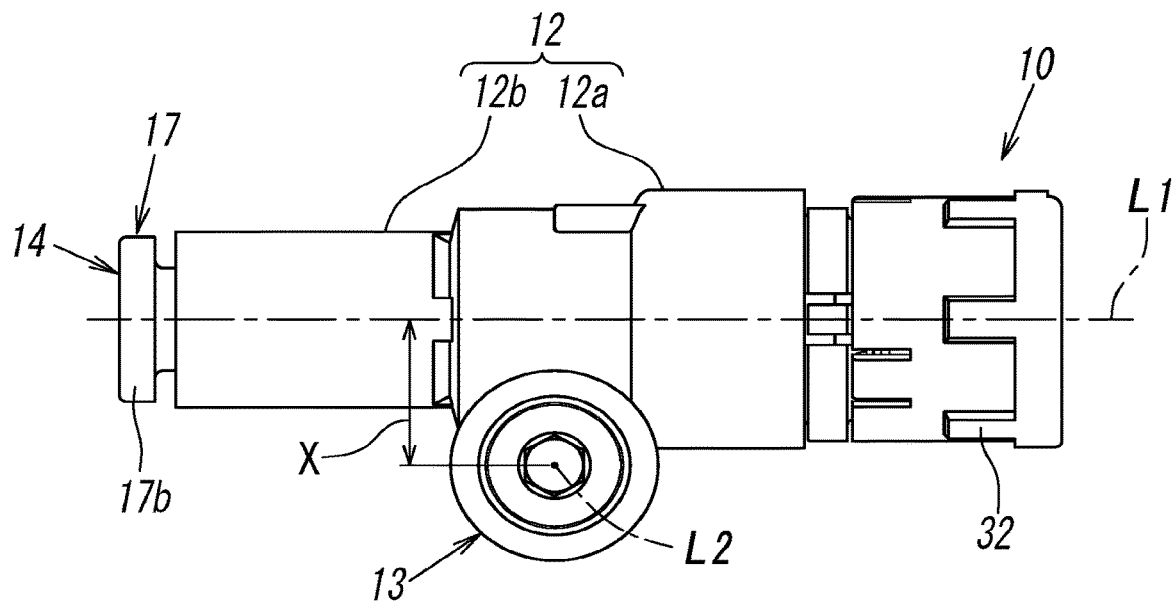
FIG. 2 is a plan view of the flow rate control valve illustrated in FIG. 1.
Figure 3:
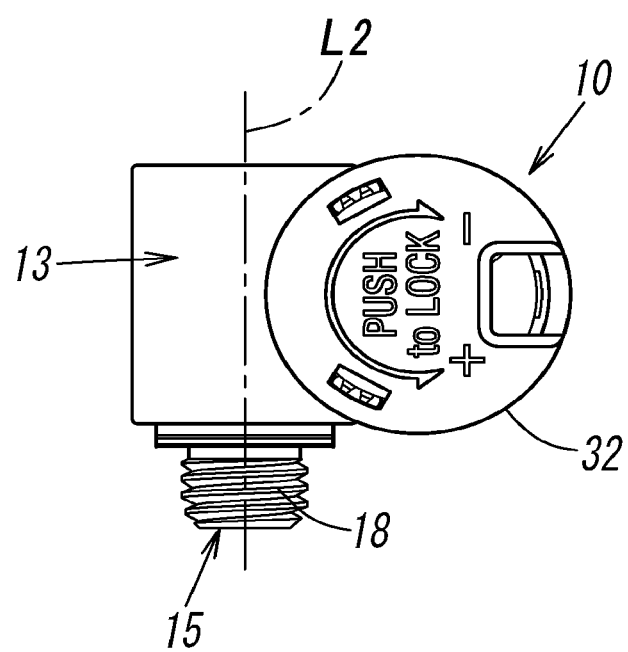
FIG. 3 is a front view of the flow rate control valve.

A flow rate control valve according to an embodiment of the present invention is described below. According to the present embodiment, fluid is compressed air, and the flow rate control valve is directly attached to a fluid pressure cylinder and is used. Thus, the flow rate control valve controls the operating speed of the fluid pressure cylinder by regulating the outlet flow from the fluid pressure cylinder. The flow rate control valve is described with reference to a meter-out speed controller as an example. However, the present invention can also be applied to, for example, a meter-in speed controller that controls the operating speed of a fluid pressure cylinder by regulating the supply flow rate of compressed air supplied to the fluid pressure cylinder. Moreover, the flow rate control valve is not exclusively used for fluid pressure cylinders and can be used for other various fluid pressure devices.

As illustrated in FIGS. 1 to 4, a flow rate control valve 10 according to the present embodiment includes a substantially cylindrical first body 12 (a body) extending along a first axis L1 and a substantially cylindrical second body 13 connected to a side surface of the first body 12 and extending along a second axis L2 perpendicular to the first axis L1. That is, the first axis L1 and the second axis L2 are in a torsional position relationship.

The first body 12 is hollow inside, and one end of the first body 12 in the direction of the first axis L1 (hereinafter referred to as an "axis L1 direction") has a first port 14 formed therein (hereinafter, the end is referred to as an "axis L1 direction front end"). The first port 14 is used to connect to a pipe from a pressure source, such as a compressor, (not illustrated). In addition, one end of 10 the second body 13 in the second axis L2 direction (hereinafter referred to as an "axis L2 direction") has a second port 15 formed therein (hereinafter, the end is referred to as an "axis L2 direction front end"). The second port 15 is used to connect to, for example, an air supply and exhaust port of a double acting fluid pressure cylinder. A fluid flow path 16 for enabling the first port 14 to communicate with the second port 15 is formed inside the first body 12 and the second body 13.

The first body 12 includes a valve accommodating portion 12a formed on the side with the other end of the first body 12 in the axis L1 direction (hereinafter, the end is referred to as an "axis L1 direction base end") and a port forming portion 12b formed on the axis L1 direction front end side. The first port 14 is open at the axis L1 direction front end of the port forming portion 12b, and an easy connection pipe joint 17 is attached to the first port 14.

When one end of a pipe is inserted into the inside of the pipe joint 17, a plurality of locking pieces 17a bite into the outer periphery of the pipe to lock the pipe. Thus, the pipe joint 17 prevents the pipe from coming off. In addition, when the release bush 17b is pushed into the inside of the pipe joint 17, the front end of the release bush 17b presses the locking pieces 17a outward and separates the locking pieces 17a from the pipe, so that the pipe can be pulled out of the pipe joint 17.

Inside the hollow portion of the valve accommodating portion 12a, a cylindrical check valve holder 20 and a cylindrical needle valve holder 21 having a plurality of different sets of an inner diameter portion and an outer diameter portion are provided coaxially so as to extend from the axis L1 direction front end side toward the axis L1 direction base end side. The check valve holder 20 10 branches part of the fluid flow path 16 into a first flow path 16a and a second flow path 16b (a flow path), which are parallel to each other. A seal member 23 is mounted on the outer periphery of the needle valve holder 21 adjacent to the axis L1 direction front end so as to airtightly seal between the needle valve holder 21 and the inner periphery of the valve accommodating portion 12a. Each of the check valve holder 20 and the needle valve holder 21 is integrally formed of synthetic resin.

The first flow path 16a is an annular flow path formed between the outer periphery of the check valve holder 20 and the inner peripheral surface of the first body 12, and the second flow path 16b is a flow path passing through a central hole 22 the check valve holder 20. The first flow path 16a and the second flow path 16b communicate with a communication flow path 19 inside the second body 13 through an internal flow path 16c between the check valve holder 20 and the needle valve holder 21.

An annular check valve 25 is provided in the first flow path 16a to limit the direction of the flow of the compressed fluid flowing through the first flow path 16a to only one direction. The check valve 25 is airtightly mounted in an annular recess portion 20a formed on the outer periphery of the check valve holder 20. The radially outer side of the check valve 25 is deformed by the action of compressed air and contacts and separates from an axis L1 direction base end facing surface of an annular seat portion 26 that protrudes radially inward from the inner periphery of the first body 12. This enables the check valve 25 to open and close the first flow path 16a.

That is, according to the present embodiment, since the check valve 25 extends radially outward, the flow of compressed air in the forward direction from the first port 14 to the second port 15 is allowed by the check valve 25 that separates from the seat portion 26 to open the first flow path 16a. In contrast, for the flow of the compressed air in the opposite direction from the second port 15 to the first port 14, the check valve 25 is brought into contact with the seat portion 26 and airtightly closes the first flow path 16a to block the flow in the opposite direction.

A valve hole 21a is formed inside the needle valve holder 21 so as to penetrate the needle valve holder 21 in the axis L1 direction, and a needle valve 27 is airtightly fitted into the valve hole 21a via a valve seal 28 in a back-and-forth movable manner in the axis L1 direction. Then, due to the back-and-forth movement of the needle valve 27, a throttle portion 27a formed at the front end of the needle valve 27 can be inserted into and withdrawn from a throttle hole 29 of the central hole 22 of the check valve holder 20. That is, when the throttle portion 27a moves back and forth with respect to the throttle hole 29 in the axis L1 direction, the distance between the throttle portion 27a and the throttle hole 29 (that is, the cross-sectional area of the flow path) changes, so that the flow rate of the compressed air flowing through the second flow path 16b is controlled.

To move the needle valve 27 back and forth in this manner, a male thread 30 is formed on the outer periphery of a portion of the needle valve 27 closer to the axis L1 direction base end than the throttle portion 27a. The male thread 30 is screwed into a female thread 31a of a needle guide 31 fixed inside the needle valve holder 21.

A cap-shaped rotary operation handle 32 is connected to the axis L1 direction base end side of the needle valve 27 via a tubular shaft portion 40. More specifically, the needle valve 27 is inserted into the shaft portion 40 so as to be mutually fixed in the rotation direction (around the first axis L1) and be movable in the axis L1 direction. Then, the handle 32 is inserted into the end of the shaft portion 40 on the axis L1 direction base end side so as to be mutually fixed around the axis L1 and be movable in the axis L1 direction. Accordingly, when the handle 32 is rotated in the forward and reverse directions, the needle valve 27 rotates in the forward and reverse directions, respectively, and is guided by the needle guide 31 to move back and forth in the axis L1 direction. As a result, the needle valve 27 moves back and forth in accordance with the rotation operation of the handle 32 and can adjust the degree of opening of the second flow path 16b.

According to the present embodiment, the flow rate control valve 10 can display the rotation operation amount of the handle 32, that is, the degree of opening of the second flow path 16b adjusted by the needle valve 27 in the form of digits and symbols so that the degree of opening can be checked by the eyes. Accordingly, the flow rate control valve 10 includes a scale body 70 supported in a rotatable manner around the axis L1 and marked with scale marks 72b each indicating the rotation operation amount of the handle 32, a scale indicator 34 that rotates together with the handle 32 around the shaft L1 at all times and that points to one of the scale marks 72b corresponding to the rotation operation amount of the handle 32, and a clutch mechanism 47 (refer to FIG. 19) that switches between the scale marks 72b of the scale body 70 pointed by the scale indicator 34 each time the handle 32 is rotated at a predetermined angle by transmitting rotation of the handle 32 to the scale body 70 or blocking the transmission of the rotation.

A display mechanism for displaying the rotation operation amount of the handle 32 (that is, the degree of opening of the second flow path 16b adjusted by the needle valve 27) is described in detail below with reference to FIGS. 4 to 21.

Figure 4:
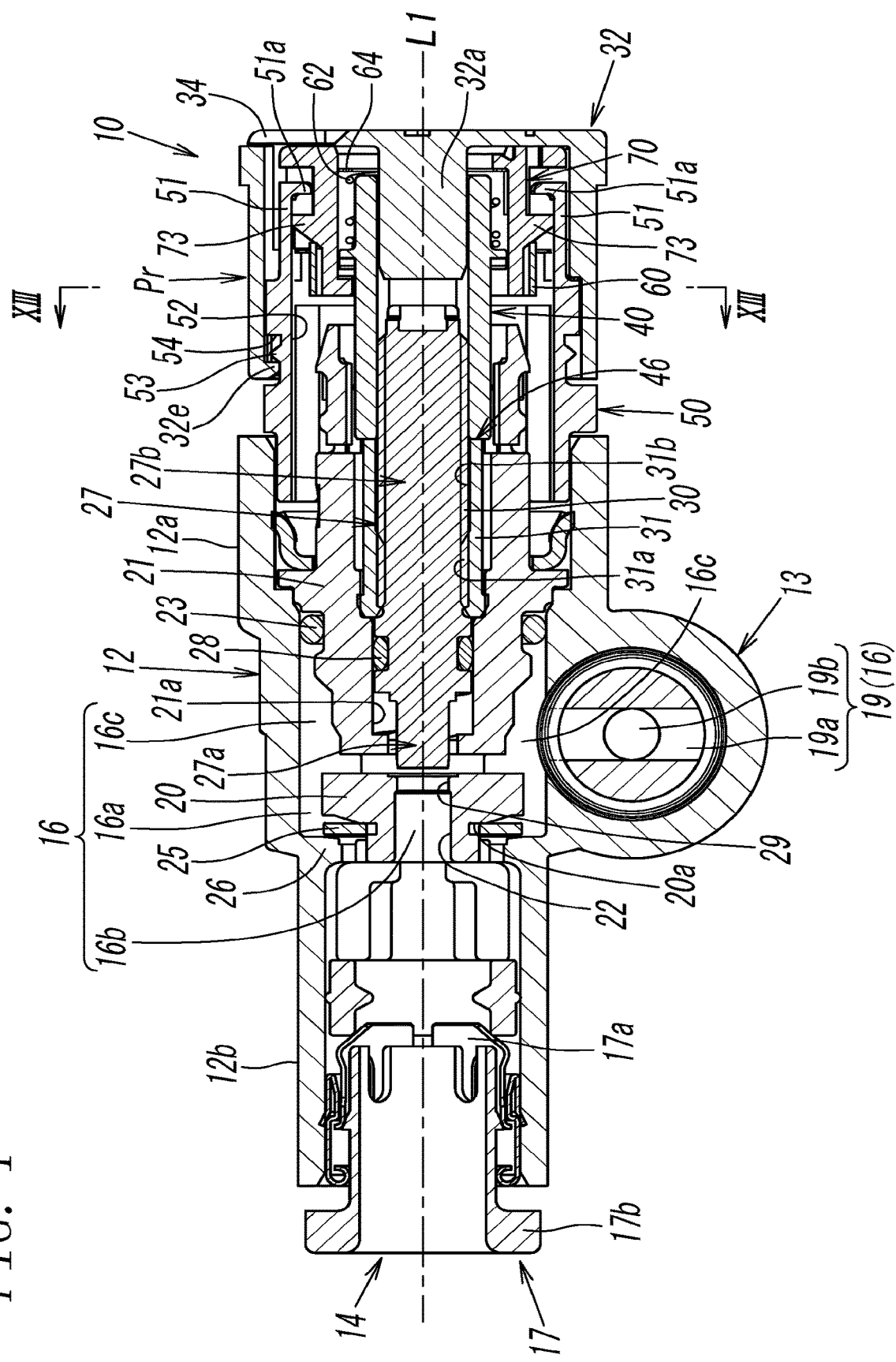
FIG. 4 is a cross-sectional view of the flow rate control valve illustrated in FIG. 1 taken along line IV-IV.
Figure 5:
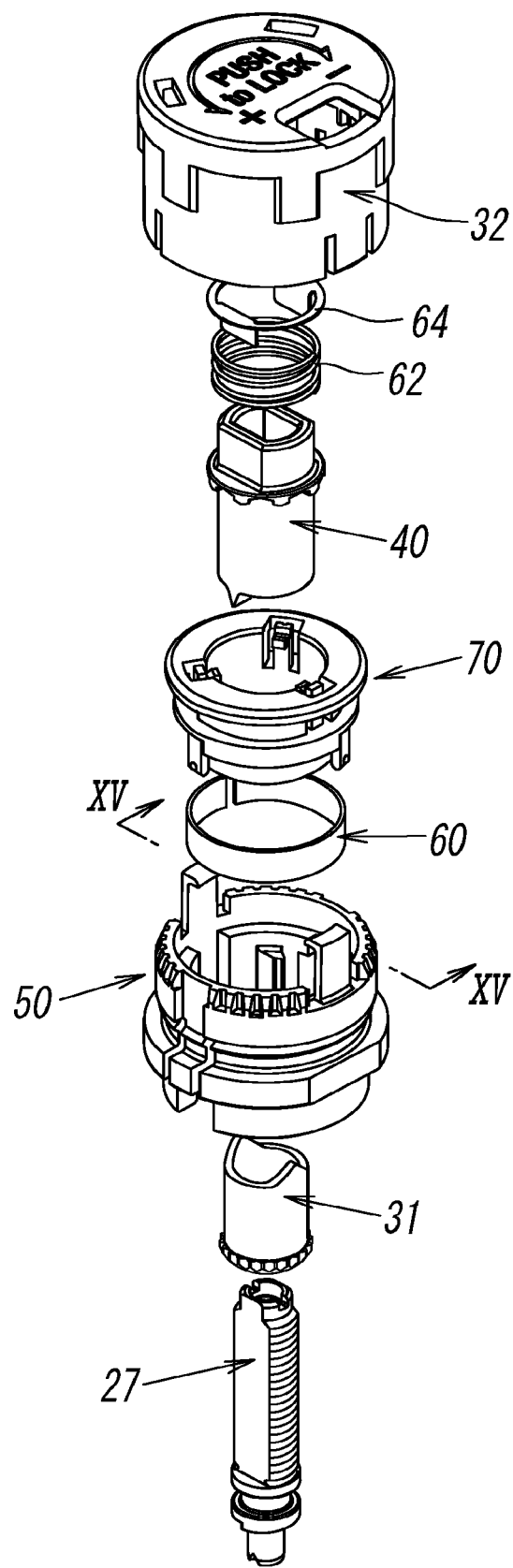
FIG. 5 is an exploded perspective view of a flow rate adjustment mechanism in the flow rate control valve illustrated in FIG. 1.

As illustrated in FIGS. 4 and 5, in the flow rate control valve 10 according to the present embodiment, the main configurations related to the display mechanism, that is, the needle valve 27, the needle guide 31, a spacer 50, a bush 60, the scale body 70, the shaft portion 40, a coil spring 62, a spring seat 64, and the handle 32, are coaxially arranged on the axis L1 in the valve accommodating portion 12a and at positions closer to the axis L1 direction base end side than the valve accommodating portion 12a.

Figure 6:
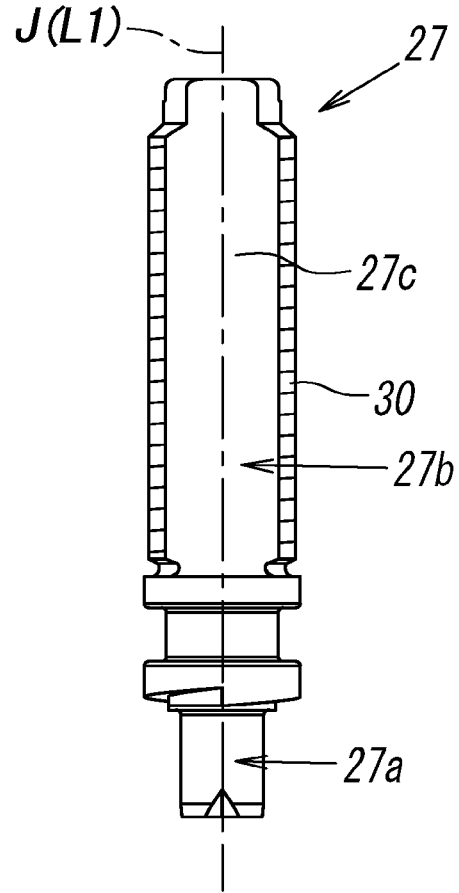
FIG. 6 is a side view of the needle valve illustrated in FIG. 5.

As illustrated in FIG. 6, the needle valve 27 is formed in a columnar shape extending in the axis L1 direction and includes the throttle portion 27a at the front end and a needle main body portion 27b formed closer to the axis L1 direction base end side than the throttle portion 27a. The needle valve 27 is made of synthetic resin, such as PBT resin. In addition, the needle main body portion 27b has a larger diameter than the throttle portion 27a and has, formed therein, a pair of flat cutout surfaces 27c, 27c on both sides in the radial direction with the central axis J (that is, the axis L1) therebetween so that the back sides of the flat cutout surfaces face each other. Then, the needle main body portion 27b having these cutout surfaces 27c is inserted into the shaft portion 40 and, as described above, the needle valve 27 is mutually fixed to the shaft portion 40 around the axis L1. Furthermore, the male thread 30 is formed on the outer peripheral surface of the needle main body portion 27b other than the cutout surfaces 27c.

Figure 7:
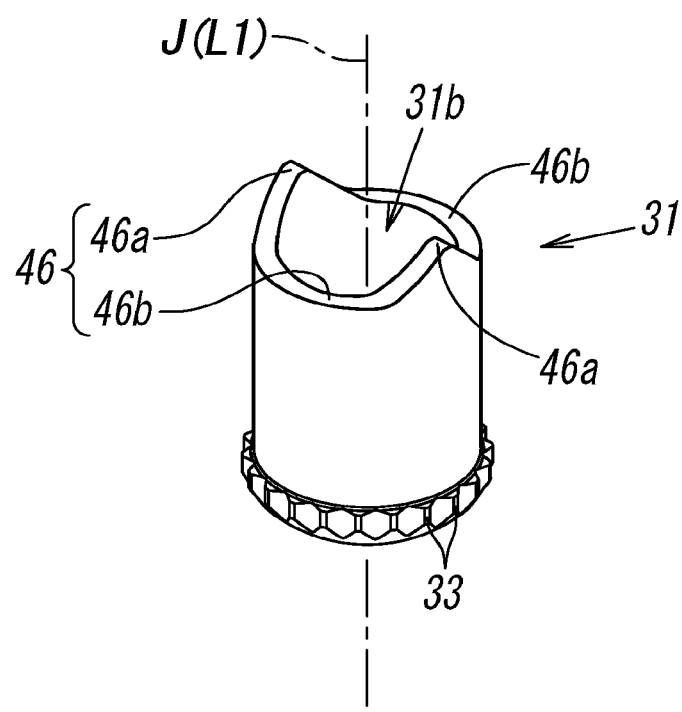
FIG. 7 is a perspective view of a needle guide illustrated in FIG. 5.

As illustrated in FIGS. 4 and 7, the needle guide 31 is formed in a cylindrical shape and is provided closer to the axis L1 direction front end side than the shaft portion 40. A through-hole 31b is provided inside the needle guide 31 so as to penetrate in the axis L1 direction, and the female thread 31a into which the male thread 30 of the needle valve 27 is to be screwed is formed on a portion of the inner peripheral surface of the through-hole 31b close to the axis L1 direction front end. Therefore, when the needle valve 27 is rotated about the axis L1 through the rotation operation of the handle 32, the needle valve 27 can be moved in the axis L1 direction relative to the needle guide 31 accordingly. The needle guide 31 is made of, for example, metal, and preferably an alloy (for example, brass). An annular cam surface 46 constituting part of a cam mechanism 45 is formed on an end surface of the needle guide 31 facing the axis L1 direction base end side. When the shaft portion 40 is rotated together with the needle valve 27 through the rotation operation of the handle 32, the 20 shaft portion 40 can be reciprocated with respect to the needle guide 31, the needle valve 27, and the handle 32 in the axis L1 direction accordingly. The cam surface 46 includes a cam protrusion 46a that protrudes toward the axis L1 direction base end side and a cam flat portion 46b that extends from the bottom of the cam protrusion 46a in the circumferential direction of the needle guide 31.

A pair of the cam protrusions 46a are formed on the end surface of the needle guide 31, and the cam protrusions 46a are provided at intervals of 180 degrees around the central axis J (that is, the axis L1) in the circumferential direction. The cam protrusions 46a, 46a are both formed in a smooth triangular shape protruding toward the axis L1 direction base end side when viewed from the side and have the same shape and the same dimensions. According to the present embodiment, the circumferential length of the cam protrusion 46a is about one fourth of the circumferential length of the end surface of the needle guide 31. In addition, the cam flat portion 46b is formed by a portion of the end surface of the needle guide 31 on the axis L1 direction base end side excluding the pair of cam protrusions 46a, 46a and is formed by an arc-shaped flat plane that is perpendicular to the axis L1 direction.

A plurality of locking protrusions 33 each protruding radially outward are formed on the outer peripheral surface of the axis L1 direction front end of the needle guide 31 at equal intervals in the circumferential direction. When the needle guide 31 is fitted to a predetermined position in the valve hole 21a of the needle valve holder 21, the locking protrusions 33 are pressed against the inner wall of the valve hole 21a of the needle valve holder 21 and, thus, prevents the needle guide 31 from rotating with respect to the needle valve holder 21 and from coming off from the valve hole 21a.

Figure 8:
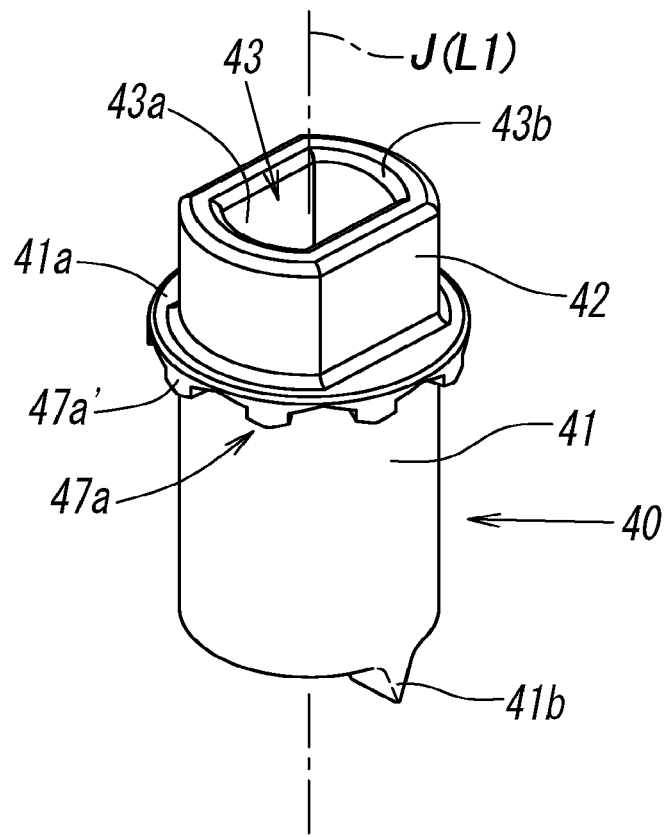
FIG. 8 is a perspective view of a shaft portion illustrated in FIG. 5.
Figure 9:
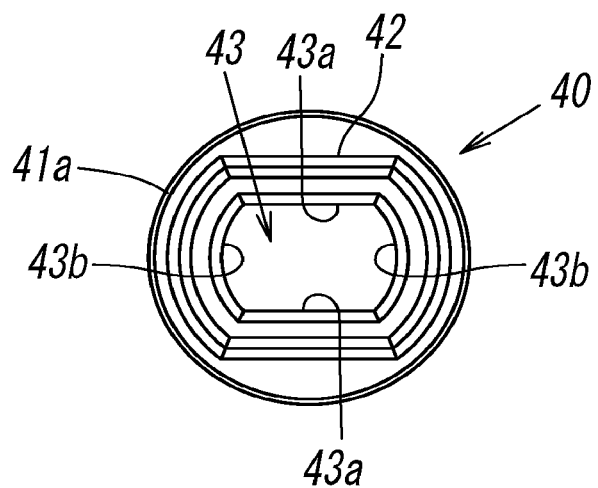
FIG. 9 is a front view of a coaxial portion.

As illustrated in FIGS. 4, 8 and 9, the shaft portion 40 is formed in a tubular shape extending in the axis L1 direction and has a first shaft portion 41 on the axis L1 direction front end side and a second shaft portion 42 closer to the axis L1 direction base end side than the first shaft portion 41. The shaft portion 40 is made of, for example, synthetic resin, and preferably polyphenylene sulfide resin (PPS resin). A through-hole 43 is formed in the shaft portion 40 so as to penetrate the shaft portion 40 along the central axis J (that is, the axis L1). The through-hole 43 is formed by a pair of flat portions 43a facing each other with the central axis J therebetween and a pair of curved portions 43b formed of circular arcs, at the center of which is the central axis J. The through-hole 43 has a cross-sectional shape similar to the cross-sectional shape of the needle main body portion 27b of the needle valve 27, and the cross-sectional area of the through-hole 43 is slightly larger than the cross-sectional area of the needle main body portion 27b. In this manner, the shaft portion 40 is mutually fixed to the needle valve 27 around the axis L1 and rotate together, and the shaft portion 40 supports the needle valve 27 in a movable manner in the axis L1 direction.

An annular biasing flange portion 41a protruding radially outward is formed at the end portion of the first shaft portion 41 on the axis L1 direction base end side. A plurality of mesh pieces 47a' each protruding toward the axis L1 direction front end side are formed on the end surface of the biasing flange portion 41a on the axis L1 direction front end side at equal intervals in the circumferential direction. Thus, a mesh portion 47a (an engaging portion) is configured. The mesh portion 47a is engaged with a gear portion 47b (refer to FIG. 11, an engaged portion) provided on the scale body 70 (described below). The mesh portion 47a and the gear portion 47b constitute a part of a clutch mechanism 47 (described below).

A cam follower protrusion 41b is formed on the end surface of the first shaft portion 41 located on the axis L1 direction front end side so as to protrude toward the axis L1 direction front end side. The cam follower protrusion 41b is formed in a triangular shape when viewed from the side and is formed at one location on the end surface of the first shaft portion 41 in the circumferential direction so as to protrude linearly in the radial direction from the outer peripheral end toward the central axis J. The front end of the cam follower protrusion 41b is disposed facing the cam surface 46 and is in slidable contact with the cam surface 46. In addition, the cam follower protrusion 41b constitutes the cam mechanism 45 together with the cam surface 46. That is, the cam follower protrusion 41b slides on the annular cam surface 46 while rotating in accordance with the rotation of the shaft portion 40 caused by the rotation operation of the handle 32. Thus, the cam mechanism 45 has a function of reciprocating the shaft portion 40 in the axis L1 direction.

An engagement projection 32a (refer to FIG. 4) of the handle 32 is fitted into the through-hole 43 in the second shaft portion 42, and the shaft portion 40 is mutually fixed to the handle 32 around the axis L1 so as to rotate together and be movable in the axis L1 direction relative to the handle 32, as described above.

In addition, as illustrated in FIG. 4, a coil spring 62 (a spring portion) formed from a compression spring is attached to the radially outer side of the second shaft portion 42. An end of the coil spring 62 on the axis L1 direction front end side is in contact with the end surface of the biasing flange portion 41a of the shaft portion 40 on the axis L1 direction base end side, while the end portion on the axis L1 direction base end side is in contact with the spring seat 64 mounted on the scale body 70 so as to always urge the shaft portion 40 toward the axis L1 direction front end side. The spring seat 64 is formed in an annular shape and is mounted on a spring seat bearing 75 of the scale body 70 with the engagement projection 32a of the handle 32 inserted therein. In addition, the coil spring 62 urges the scale body 70 toward the axis L1 direction base end side via the spring seat 64 and the spring seat bearing 75 so that an end of the scale body 70 on the axis L1 direction base end side is in contact with the inner surface of a top panel 32b of the handle 32.

According to the present embodiment, a clutch drive mechanism 48 is constituted by the shaft portion 40, the needle guide 31, the cam mechanism 45 provided between the shaft portion 40 and the needle guide 31, and the coil spring 62 described above. In addition, the clutch mechanism 47 is constituted by the clutch drive mechanism 48, the mesh portion (the engaging portion) 47a, and the gear portion (the engaged portion) 47b.

Figure 10:
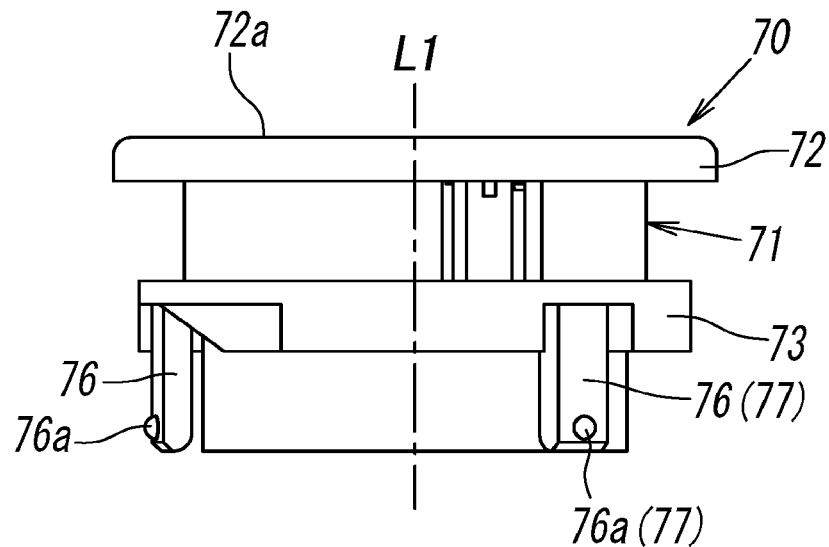
FIG. 10 is a side view of a scale body illustrated in FIG. 5.
Figure 11:
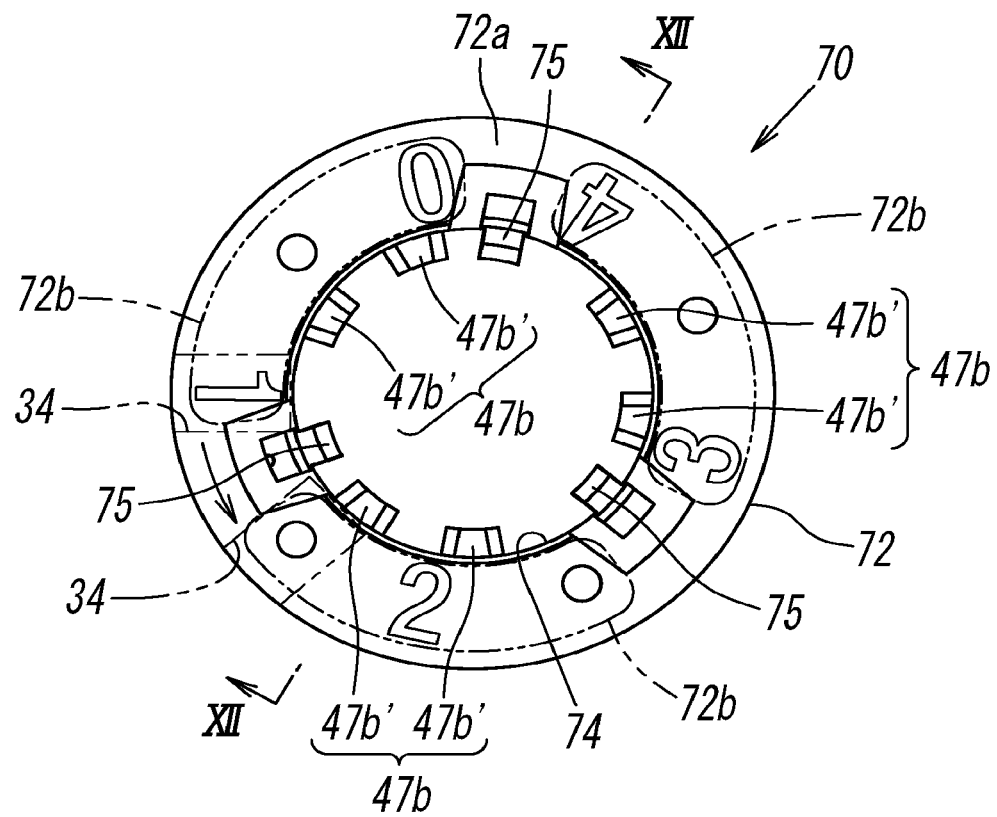
FIG. 11 is a front view of the scale body.

As illustrated in FIGS. 4, 10, and 11, the scale body 70 is formed in a tubular shape extending in the axis L1 direction and is disposed so as to surround a portion of the shaft portion 40 on the axis L1 direction base end side. The scale body 70 is provided so as to be rotatable about the axis L1 and movable in the axis L1 direction relative to the shaft portion 40. The scale body 70 is made of, for example, synthetic resin and preferably polyacetal (POM). Furthermore, the scale body 70 has a tubular ring main body portion 71. At the end of the ring main body portion 71 on the axis L1 direction base end side, a flange-shaped dial plate 72 is formed so as to protrude radially outward and extend annularly in the circumferential direction. An annular flat portion 72a extending in the circumferential direction is formed on an end surface of the dial plate 72 on the axis L1 direction base end side, and scale marks 72b each indicating the rotation operation amount (for example, the number of rotations) of the handle 32 are provided on the flat portion 72a.

According to the present embodiment, the scale marks 72b are digits 1, 2, 3, . . . indicating the number of rotations of the handle 32 (that is, the number of times the handle 32 has been turned 360 degrees) and the symbol "o". The symbol "o" is marked at the center position between every two adjacent digits and indicates half a rotation of the handle 32 (that is, the handle 32 is rotated 180 degrees from the position of each of the above-described digits indicating the numbers of rotations). For example, the symbol "o" between "0" and "1" represents "0.5", the symbol "o" between "1" and "2" represents "1.5", the symbol "o" between "2" and "3" represents "2.5", and the symbol "o" between "3" and "4" represents "3.5". Therefore, instead of these symbols "o", the digits "0.5", "1.5", "2.5", and "3.5" may be used. Of the series of scale marks 72b, the scale mark 72b corresponding to the actual rotation operation amount of the handle 32 is indicated by the scale indicator 34 provided on the handle 32.

A collar portion 73 that protrudes radially outward and extends annularly in the circumferential direction is formed at an intermediate section of the ring main body portion 71 in the axis L1 direction. The outer diameter of the collar portion 73 is less than the outer diameter of the dial plate 72. As illustrated in FIG. 4, the outer periphery of the collar portion 73 of the scale body 70 is in slidable contact with the inner surface of a locking claw portion 51 of the spacer 50 and, thus, the movement of the scale body 70 in the radial direction is restricted. A locking protrusion 51a protrudes inward from the front end of the locking claw portion 51, and the movement range of the scale body 70 toward the axis L1 direction front end side is regulated by the locking protrusion 51a inserted into the space between the dial plate 72 and the collar portion 73.

Figure 12:
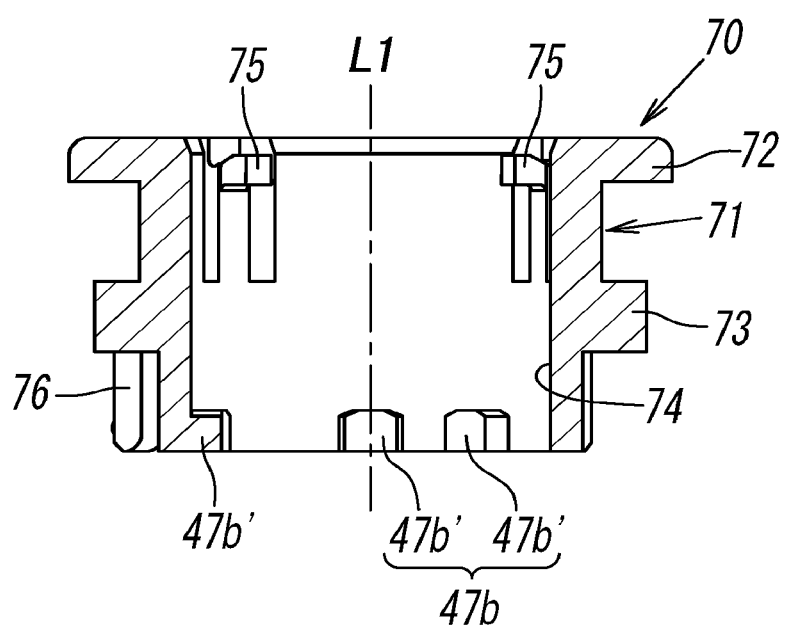
FIG. 12 is a cross-sectional view taken along line XII-XII in FIG. 11.

As illustrated in FIGS. 11 and 12, the ring main body portion 71 has, formed thereinside, a ring hole 74 penetrating in the axis L1 direction, and gear pieces 47b' protruding radially inward are provided on the inner surface of the ring hole 74 on the axis L1 direction front end side. According to the present embodiment, the gear portions 47b (the engaged portions) each consisting of the pair of gear pieces 47b', 47b' that are arranged at a predetermined interval in the circumferential direction are disposed at three locations in the circumferential direction at equal intervals greater than the predetermined interval. The gear portions 47b are disposed closer to the axis L1 direction front end side than the mesh portion 47a of the shaft portion 40 and are switched between an engaged mode in which the gear portions 47b are engaged with the mesh portion 47a and a disengaged mode in which the gear portions 47b are disengaged from the mesh portion 47a due to the reciprocating movement of the shaft portion 40 in the axis L1 direction. Thus, as described above, the gear portions 47b constitute part of the clutch mechanism 47 together with the mesh portion 47a provided on the shaft portion 40. The engagement and disengagement of the gear portions 47b with and from the mesh portion 47a due to the rotation operation of the handle 32 can transmit the rotation of the shaft portion 40 to the scale body 70 and block the transmission of the rotation of the shaft portion 40 to the scale body 70.

That is, as illustrated in FIGS. 4 and 10, in the clutch mechanism 47, when the mesh portion 47a and the gear portions 47b are in the engaged mode, the rotation of the handle 32 is transmitted to the scale body 70, and the scale body 70 rotates together with the handle 32. In contrast, when the mesh portion 47a and the gear portions 47b are in a disengaged mode, the transmission of rotation of the handle 32 to the scale body 70 is blocked, and the handle 32 rotates with respect to the scale body 70. Thus, the scale mark 72b of the scale body 70 indicated by the scale indicator 34 of the handle 32 is switched. However, when the transmission of rotation of the handle 32 to the scale body 70 is blocked and if the scale body 70 is in contact with the handle 32 or a member that always rotates together with the handle 32, the scale body 70 may rotate together with the handle 32, disabling accurate switching of the scale mark 72b. For this reason, according to the present embodiment, the scale body 70 is integrally provided with plate-like arm portions 76 each extending from the collar portion 73 of the ring main body portion 71 toward the axis L1 direction front end side. In addition, a locking protrusion 76a is provided so as to protrude outward from the outer surface of a front end portion of each of the arm portions 76 facing radially outward.

Figure 13:
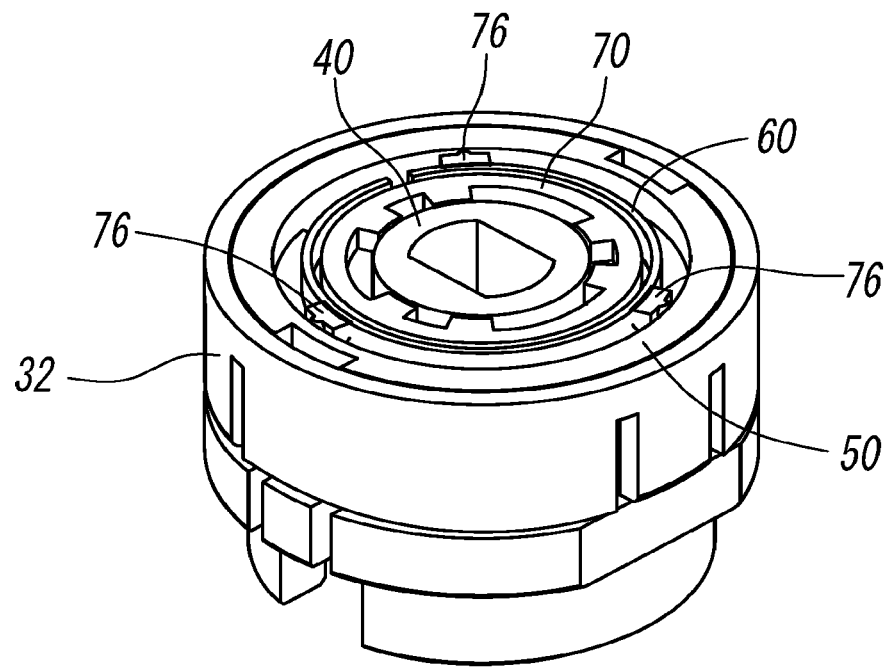
FIG. 13 is a cross-sectional perspective view taken along line XIII-XIII in FIG. 4.

As illustrated in FIGS. 10 and 13, three of the arm portions 76 are provided at equal intervals in the circumferential direction of the collar portion 73. The front end portion of the arm portion 76 is elastically deformable in the radial direction by using the base portion integrally joined to the collar portion 73 as a fulcrum. The locking protrusion 76a formed in a hemispherical shape is in slidable contact with an inner peripheral surface 52a (a resistive force generating surface) of the spacer 50 which is fixedly provided on the first body 12. That is, the scale body 70 is supported by the spacer 50 with the locking protrusion 76a of the arm portion 76 being in slidable contact with the spacer. As a result, when the scale mark 72b indicated by the scale indicator 34 is switched, the resistance generated between the locking protrusion 76a of the arm portion 76 and the inner peripheral surface 52a of the spacer 50 can prevent the scale body 70 from rotating with the rotation of the handle 32. In addition, the reference numeral "60" denotes the bush formed in a C-shaped tubular shape. The bush 60 is disposed closer to the axis L1 direction front end side than the collar portion 73 of the scale body 70 and is disposed between the outer peripheral surface of the ring main body portion 71 of the scale body 70 and the inner surface of the locking protrusion 76a in the radial direction. Then, the locking protrusion 76a is supported from the inner surface side by the bush 60 disposed in this manner. The bush 60 is made of metal, and preferably stainless steel.

The number of arm portions 76 provided on the scale body 70 is not limited to three as in the present embodiment, and a plurality of arm portions 76 are sufficient. In addition, the shape of the locking protrusion 76a is not limited to a hemispherical shape and may be any shape that is suitable for sliding with friction. Furthermore, the above-described arm portion 76 and locking protrusion 76a are collectively referred to as a contact portion 77.

Figure 14:
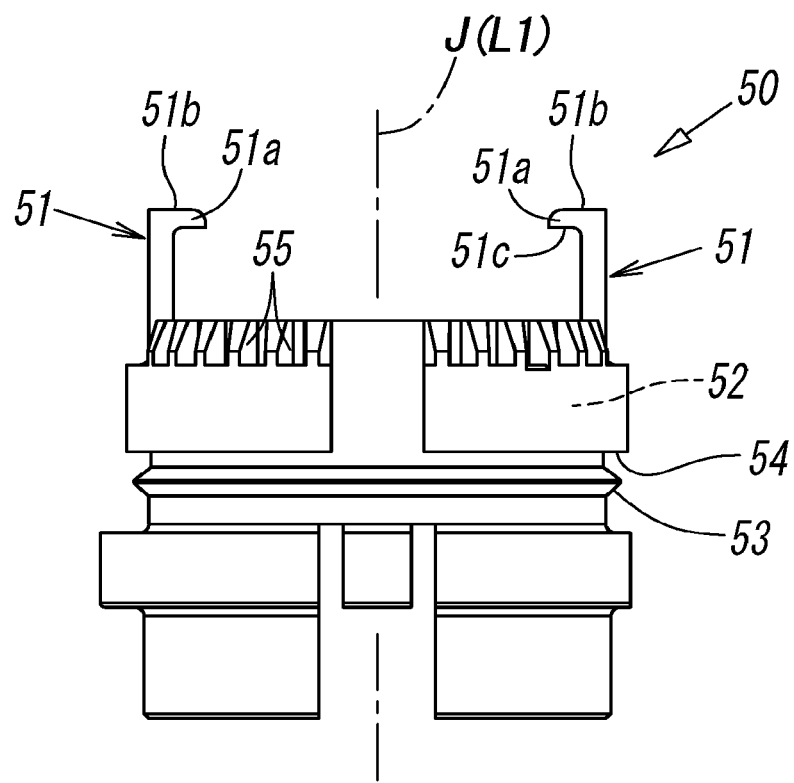
FIG. 14 is a side view of a spacer illustrated in FIG. 5.

As illustrated in FIGS. 4 and 14, the spacer 50 is formed in a cylindrical shape extending in the axis L1 direction (a central axis J direction) and is disposed radially outward of the scale body 70 so as to surround the scale body 70. A through-hole 52 is formed inside the spacer 50 so as to penetrate in the axis L1 direction, and the inner diameter of the through-hole 52 is slightly larger than the outer diameter of the collar portion 73 of the scale body 70. For this reason, the scale body 70 can move in the axis L1 direction relative to the spacer 50. The spacer 50 is made of, for example, synthetic resin, and preferably polybutylene terephthalate resin (PBT resin).

Figure 15:
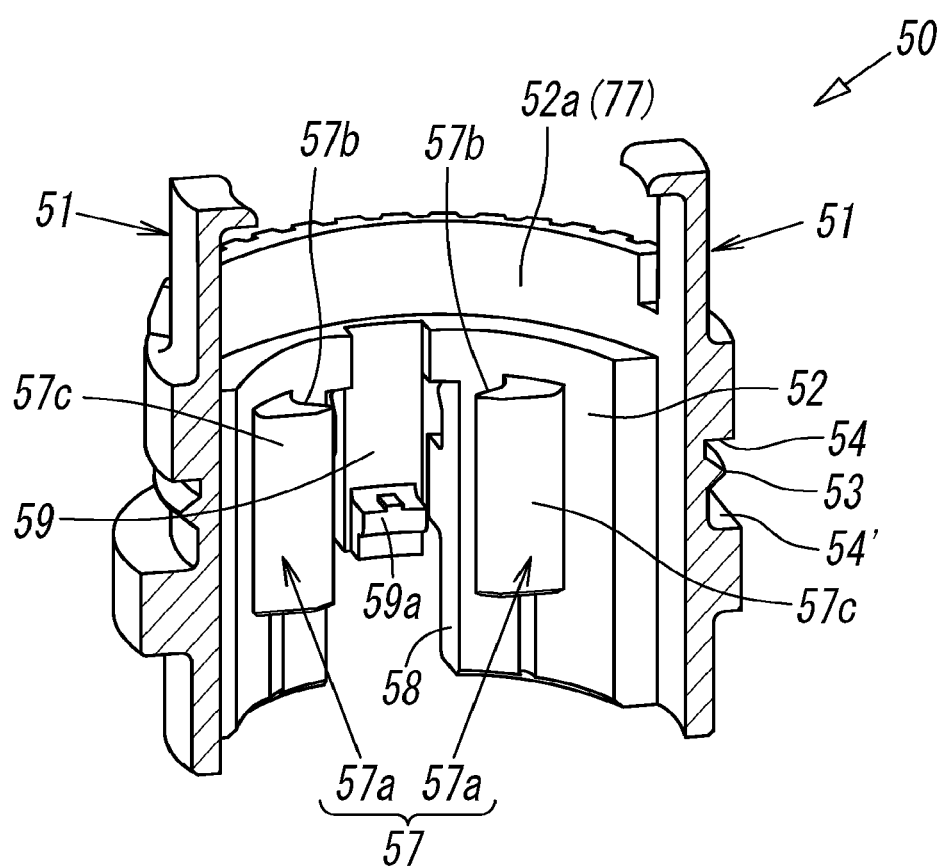
FIG. 15 is a cross-sectional perspective view of the spacer taken along line XV-XV in FIG. 5.

As illustrated in FIG. 15, the inner surface of the spacer 50 that forms the through-hole 52 is provided with fixed pieces 57a each protruding radially inward. According to the present embodiment, a circumferential fixing portion 57 formed from a pair of the fixed pieces 57a arranged at predetermined interval in the circumferential direction is disposed on both sides of the central axis J in the radial direction. That is, two circumferential fixing portions 57 are provided on the inner surface that forms the through-hole 52. Each of the fixed pieces 57a extends from the inner surface of the through-hole 52 so as to tilt obliquely from the with respect to the radial direction in plan view. The fixed piece 57a includes a first surface portion 57b extending inward at an acute angle to the inner surface and a second surface portion 57c extending inward at a smaller acute angle to the inner surface.

Figure 16:
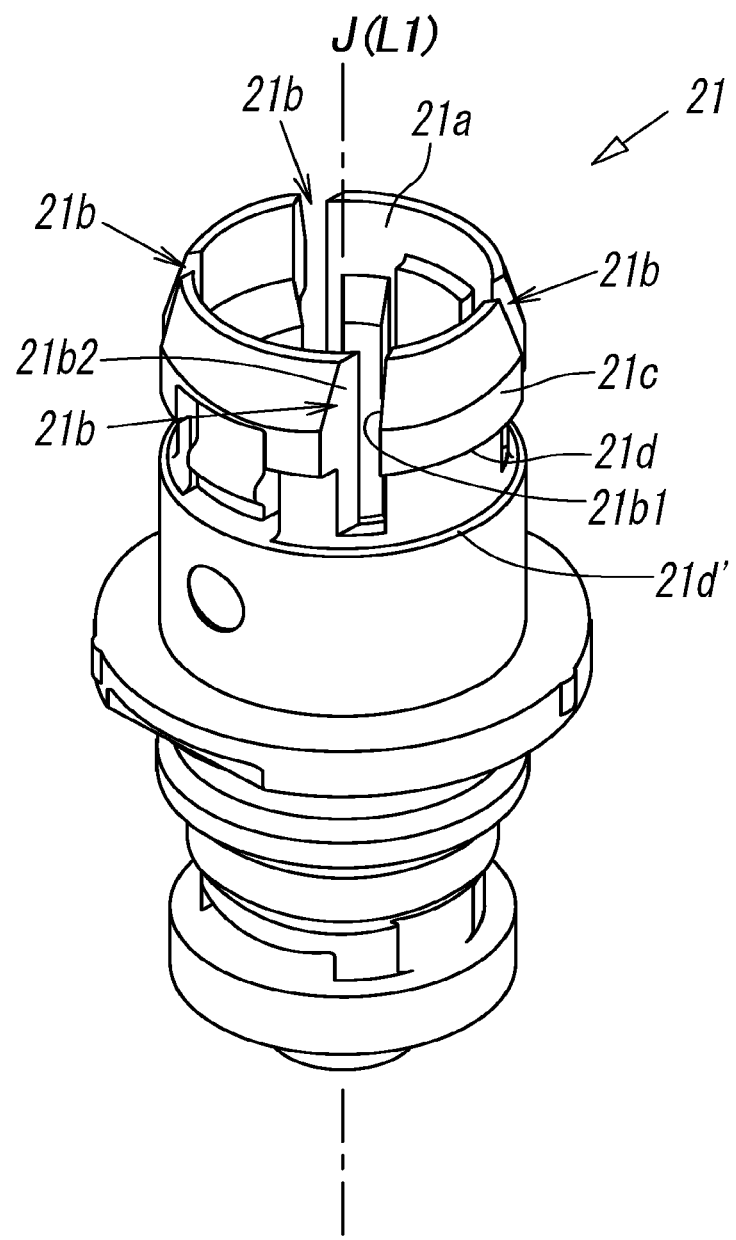
FIG. 16 is a perspective view of a needle valve holder illustrated in FIG. 4.

The fixed pieces 57a are inserted into fixing holes 21b formed in a portion of the needle valve holder 21 on the axis L1 direction base end side illustrated in FIG. 16. Thus, the fixed pieces 57a prevent rotation of the spacer 50 about the axis L1. The fixing holes 21b are formed in a portion of a peripheral wall 21c of the needle valve holder 21 on the axis L1 direction base end side, open at the end of the peripheral wall 21c on the axis L1 direction base end side, and extends toward the axis L1 direction front end side. In addition, each of the fixing holes 21b extends in a direction tilted with respect to the radial direction in plan view and includes a first fixing surface portion 21b1 with which the first surface portion 57b of the fixed piece 57a is in contact and a second fixing surface portion 21b2 with which the second surface portion 57c of the fixed piece 57a is in contact.

As illustrated in FIG. 15, an opening 58 is formed between the pair of fixed pieces 57a adjacent to each other in the circumferential direction of the spacer 50 so as to extend in a direction from the axis L1 direction base end side to the front end side. In the opening 58, a plate-shaped leg portion 59 is formed that is connected to the end portion on the axis L1 direction base end side and extends toward the axis L1 direction front end side. An inner surface of the front end of the leg portion 59 is provided with a locking protrusion 59a protruding radially inward. The radially inner end portion of the locking protrusion 59a protrudes slightly inward beyond the inner surface of the through-hole 52 and is locked between a pair of annular stepped portions 21d, 21d' formed, with a space therebetween in the axis L1 direction, in a portion of the needle valve holder 21 adjacent to the axis L1 direction base end side illustrated in FIG. 16. As a result, the movement of the spacer 50 is restricted in the axis L1 direction with respect to the needle valve holder 21, and the spacer 50 is fixed.

As illustrated in FIG. 14, on the radially outer side of an intermediate section of the spacer 50 in the axial direction, an annular protruded rim portion 53 protruding radially outward is formed in an annular shape in the circumferential direction. When the engagement claw portion 32e of the handle 32 is latched onto the annular protruded rim portion 53, the handle 32 is locked with respect to the spacer 50 in the rotation direction (the details are described below). A radially outwardly extending stepped portion 54 having an annular shape is formed closer to the axis L1 direction base end side than the annular protruded rim portion 53.

A pair of locking claw portions 51 are provided on the axis L1 direction base end side of the spacer 50 so as to be disposed on either side in the radial direction with the central axis J therebetween and protrude toward the axis L1 direction base end side. The locking protrusion 51a that protrudes radially inward is provided on the end portion of the locking claw portions 51 of the axis L1 direction base end. A surface of the locking protrusion 51a facing the axis L1 direction base end side forms a flat portion 51b extending in a direction perpendicular to the axis L1 direction (the radial direction). In addition, an inner surface 51c of the locking protrusion 51a facing the axis L1 direction front end side is in contact with the collar portion 73 of the scale body 70 so as to regulate the range of movement of the scale body 70 toward the axis L1 direction base end side. Furthermore, a plurality of locking recesses 55 that concave radially inward are provided on the outer peripheral surface of the end portion of the spacer 50 on the axis L1 direction base end side at intervals in the circumferential direction. The locking recesses 55 are used to lock the rotation of the handle 32.

Figure 17:
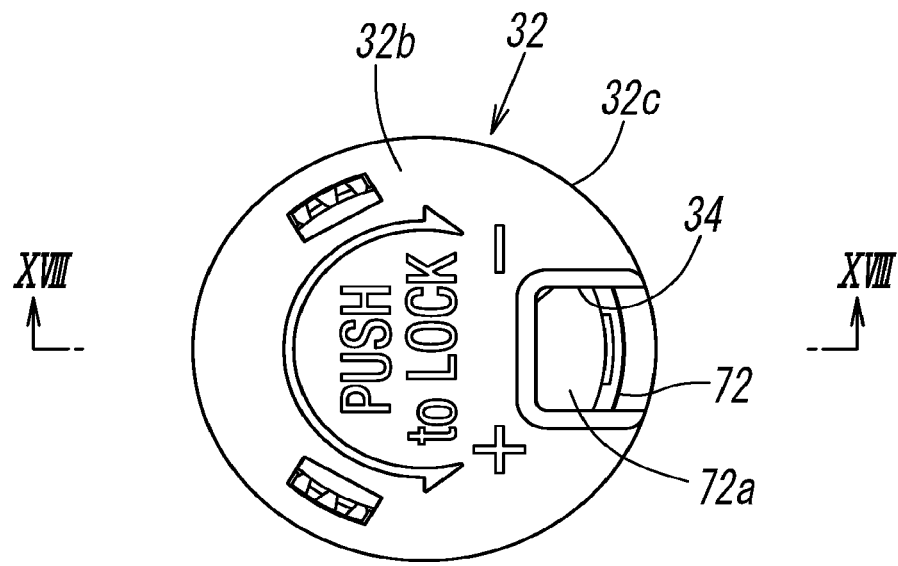
FIG. 17 is a front view of a handle illustrated in FIG. 5.
Figure 18:
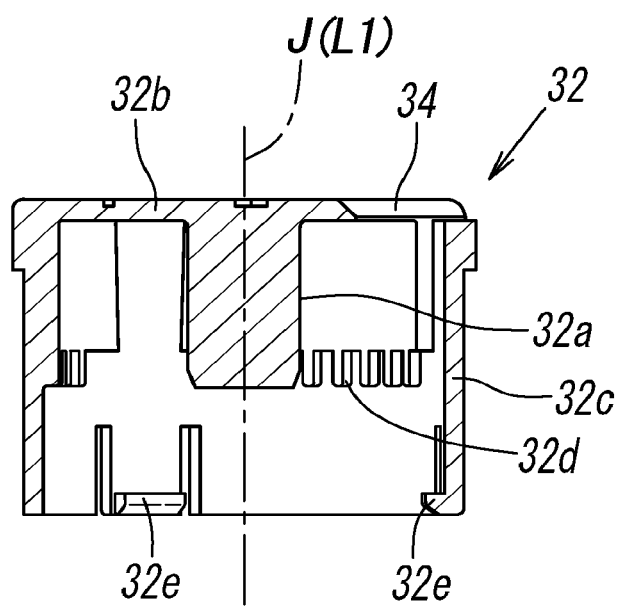
FIG. 18 is a cross-sectional view taken along line XVIII-XVIII in FIG. 17.

As illustrated in FIGS. 4, 17 and 18, the handle 32 includes the top panel 32b extending in the radial direction and a side panel 32c extending from the peripheral edge of the top panel 32b toward the axis L1 direction front end side to form a tubular shape. Thus, the handle 32 is formed in a one end closed tubular shape. The handle 32 is made of, for example, synthetic resin and preferably polyacetal resin (POM resin). The handle 32 having such a shape is mounted on the radially outer side of the spacer 50 in such a manner as to surround a portion of the spacer 50 on the axis L1 direction base end side. The inner surface of the top panel 32b of the handle 32 is provided with the engagement projection 32a extending along the central axis J (i.e., the axis L1) and protruding toward the axis L1 direction front end side. The engagement projection 32a has a shape similar to the cross-sectional shape of the through-hole 43 of the shaft portion 40 described above and is inserted into the through-hole 43 of the shaft portion 40. Thus, as described above, the handle 32 is mutually fixed to the shaft portion 40 and rotates together with the shaft portion 40 about the shaft L1, while the handle 32 is movable in the axis L1 direction relative to the shaft portion 40.

As illustrated in FIG. 17, the top panel 32b of the handle 32 is provided with the scale indicator 34 that indicates the scale mark 72b corresponding to the rotation operation amount of the handle 32. According to the present embodiment, the scale indicator 34 is a "scale indicating opening" that penetrates the top panel 32b in the axis L1 direction and has a rectangular shape that extends radially inward from the peripheral edge of the top panel 32b. The flat portion 72a of the dial plate 72 of the scale body 70 is exposed through the scale indicating opening 34, so that the scale mark 72b (refer to FIG. 11) marked on the flat portion 72a can be viewed through the scale indicator 34.

As illustrated in FIG. 18, the plurality of engagement protrusions 32d protruding radially inward and extending in the axis L1 direction are provided on the inner peripheral surface of the intermediate section of the side panel 32c in the axis L1 direction at equal intervals in the circumferential direction. When the handle 32 is moved toward the axis L1 direction front end side relative to the shaft portion 40, the engagement protrusions 32d mesh with the locking recesses 55 (refer to FIG. 14) of the spacer 50 to lock the rotation of the handle 32. In contrast, when the handle 32 is moved toward the axis L1 direction base end side with the engagement protrusions 32d and the locking recesses 55 being engaged, the engagement protrusions 32d are pulled out of the locking recesses 55, and the rotation of the handle 32 in the rotation direction is unlocked.

When, as illustrated in FIG. 4, the engagement protrusions 32d and the locking recesses 55 are meshed with each other to lock the rotation of the handle 32, the engagement claw portion 32e provided on the inner surface of the axis L1 direction front end of the side panel 32c is latched onto the above-described annular protruded rim portion 53 provided on the outer peripheral surface of the spacer 50, and the handle 32 is held at a locked position Pr. In contrast, when the handle 32 is moved from the locked position Pr toward the axis L1 direction base end side, the engagement claw portion 32e climbs over the above-described annular protruded rim portion 53 and is latched onto the stepped portion 54 provided closer to the axis L1 direction base end side than the annular protruded rim portion 53. The engagement claw portion 32e latched onto the stepped portion 54 is sandwiched between the stepped portion 54 and the annular protruded rim portion 53, and the handle 32 is held in an unlocked mode.

As described above, in the flow rate control valve 10 according to the present embodiment, the shaft portion 40, the scale body 70, and the spacer 50 are coaxially arranged on the axis L1 inside the handle 32. For this reason, the flow rate control valve 10 can be made more compact than existing ones in which the central axis J of the scale body 70 is radially offset from the axis L1.

As illustrated in FIGS. 1, 2, 3 and 4, the second body 13 is connected to the side surface of the valve accommodating portion 12a of the first body 12 in such a manner as to protrude radially outward from the first body 12. The second body 13 is formed in a substantially columnar outer shape. The end of the second body 13 on the axis L2 direction base end side (the upper end in FIG. 1) is airtightly closed, and the end of the second body 13 on the axis L2 direction front end side (the lower end in FIG. 1) has the second port 15 that is open. A male thread 18 is formed on the outer periphery of the second port 15 around the axis L2 and, thus, the second port 15 can be attached to the body of a pneumatic device, such as a pneumatic cylinder, by screwing, and can be connected to a flow path formed in the body of the pneumatic device.

In addition, in the interior of the second body 13, a communication flow path 19 is formed that constitutes part of the fluid flow path 16 and that enables the internal flow path 16c formed in the first body to communicate with the second port 15. The communication flow path 19 is formed by a connection flow path 19a that perpendicularly crosses the axis L2 in the second body 13, extends in the radial direction, and is connected to the internal flow path 16c of the first body and a port flow path 19b that extends on the axis L2 along the axis L2 in the second body 13 and that has one end connected to the connection flow path 19a and the other end connected to the second port 15. That is, the port flow path 19b is formed at a position separated radially outwardly from the axis L1 by a distance X (refer to FIG. 2), which is the distance between the axis L1 and the axis L2.

Figure 19:
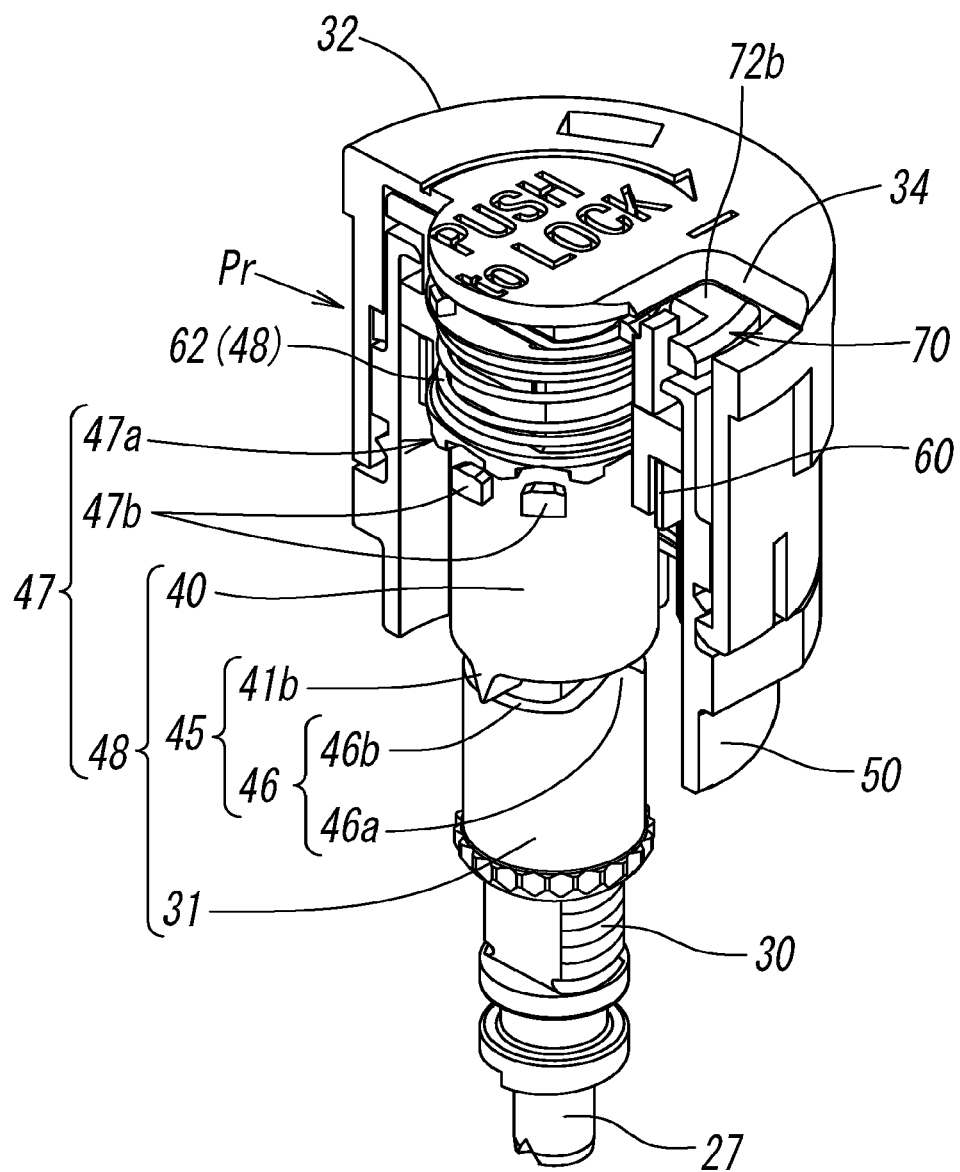
FIG. 19 is an illustration diagram describing the operation performed by the clutch mechanism and the cam mechanism illustrated in FIG. 5 and illustrates a situation where the rotation of the handle is locked.

The switching operation to switch between the scale marks 72b in accordance with the rotation operation amount of the handle 32 is described below with reference to FIGS. 19 to 21. FIG. 19 illustrates a situation in which the handle 32 has moved to the locked position Pr and the rotation of the handle 32 is restricted. In the situation, the handle 32 is pressed toward the axis L1 direction front end side, and the engagement protrusions 32d (refer to FIG. 18) of the handle 32 meshes with the locking recesses 55 (refer to FIG. 14) of the spacer 50. Thus, rotation of the handle 32 is restricted. In addition, as the handle 32 is pressed and moved toward the axis L1 direction front end side, the scale body 70 in contact with the inner surface of the top panel 32b of the handle 32 also moves toward the axis L1 direction front end side. Thus, the gear portion 47b is separated from the mesh portion 47a. Furthermore, the biasing force of the coil spring 62 causes the shaft portion 40 to move toward the axis L1 direction front end side, and the cam follower protrusion 41b of the cam mechanism 45 is in contact with the cam flat portion 46b of the cam surface 46.

Figure 20:
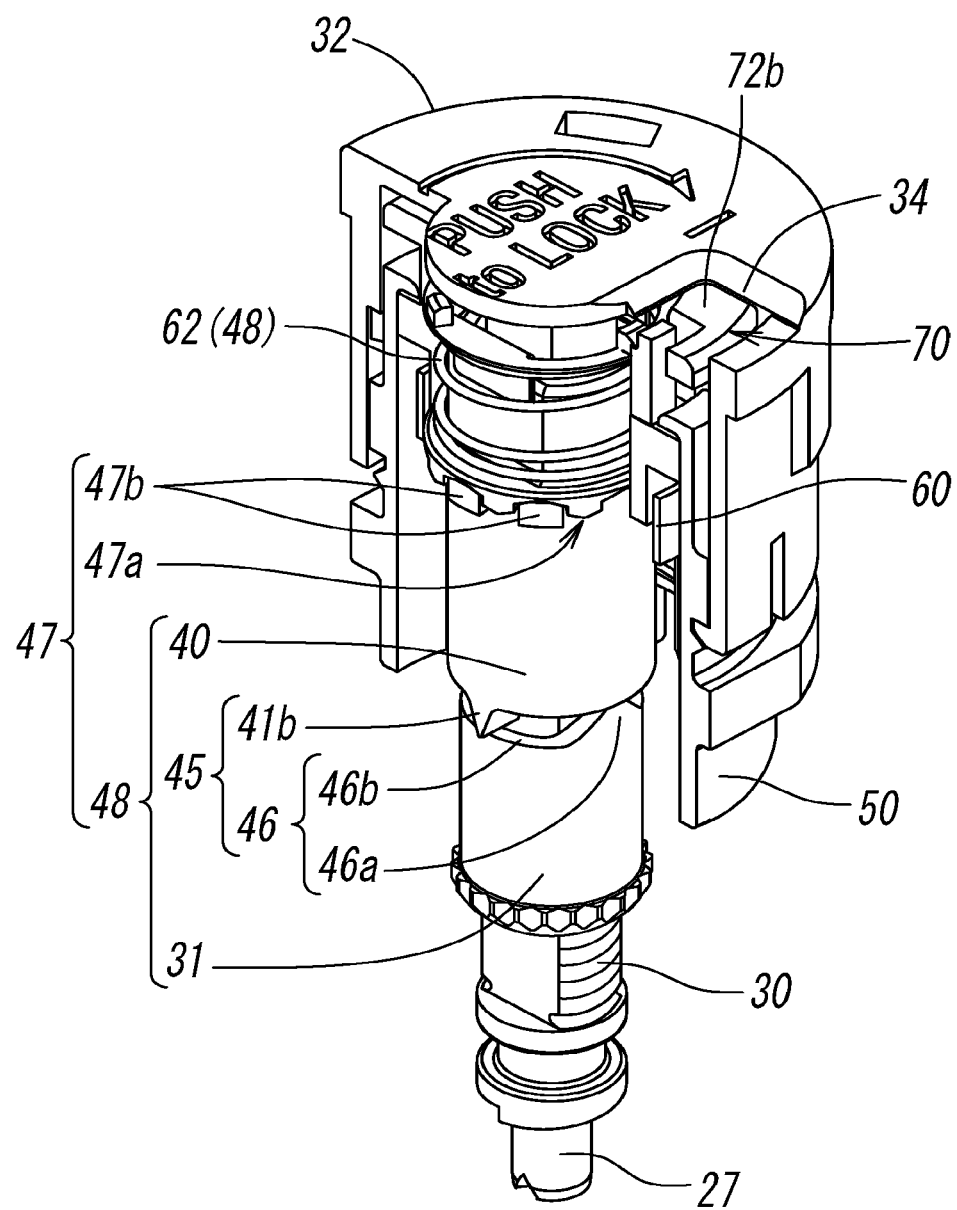
FIG. 20 is an illustration diagram describing the operations performed by a clutch mechanism and the cam mechanism in FIG. 5 and illustrates a situation where the rotation of the handle is unlocked, and the clutch mechanism is engaged.

In this situation, as illustrated in FIG. 20, when the handle 32 is moved toward the axis L1 direction base end side to unlock the handle 32, the biasing force of the coil spring 62 moves the scale body 70 toward the axis L1 direction base end side. Along with the movement of the scale body 70, the gear portion 47b provided on the scale body 70 moves in the same direction, and the mesh portion 47a and the gear portion 47b of the clutch mechanism 47 mesh with each other. Therefore, the scale body 70 is rotatable about the axis L1 while being mutually fixed to the shaft portion 40.

As described above, when the handle 32 is rotated about the axis L1 counterclockwise (the "+" direction of the arrow) with the scale body 70 and the shaft portion 40 being fixed to each other, the scale body 70 and the shaft portion 40 are rotated in the same direction as the handle 32. Then, the cam follower protrusion 41b of the cam mechanism 45 moves toward the cam protrusion 46a while sliding on the cam flat portion 46b.

Figure 21:
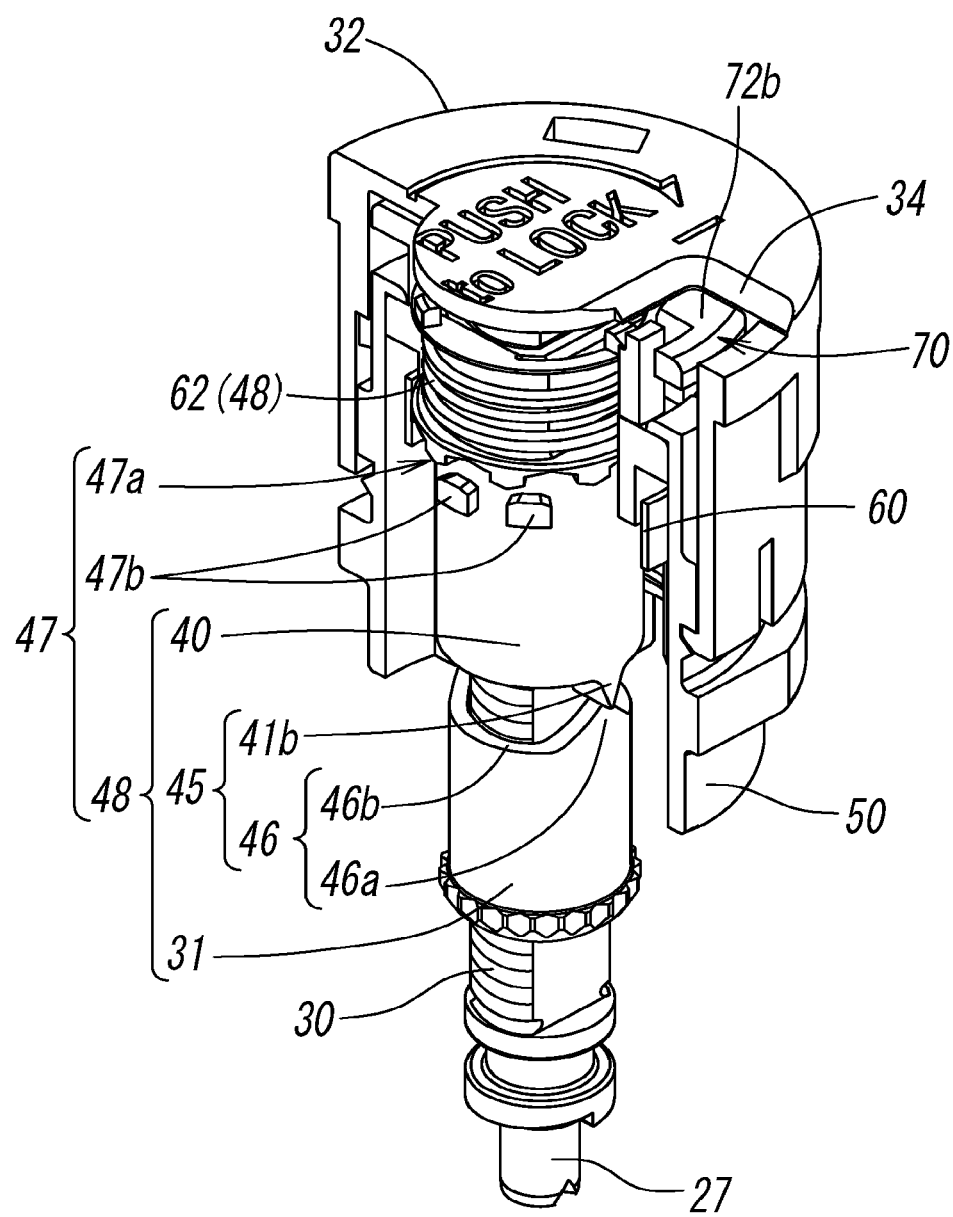
FIG. 21 is an illustration diagram describing the operation performed by the clutch mechanism and the cam mechanism illustrated in FIG. 5 and illustrates a situation where the rotation of the handle is unlocked, and the clutch mechanism is disengaged.

In this situation, the handle 32 is further rotated, and as illustrated in FIG. 21, when the cam follower protrusion 41b reaches above the cam protrusion 46a against the biasing force of the coil spring 62, the shaft portion 40 is moved toward the axis L1 direction base end side. Then, the mesh portion 47a is unengaged from the gear portion 47b in the clutch mechanism 47, and the rotation of the shaft portion 40 is no longer transmitted to the scale body 70, so that the rotation of the scale body 70 is stopped. In this situation, when the handle 32 is further rotated, the scale indicator 34 (the scale indicating opening) formed in the handle 32 rotates on the dial plate 72 of the scale body 70 that is stopped, as illustrated in FIG. 11. Thus, the scale mark 72b indicated by the scale indicator 34 is switched to the immediately adjacent scale mark 72b. For example, in FIG. 11, the scale mark 72b displayed through the scale indicating opening 34 is switched from "1" to "o" (1.5) which is marked between "1" and "2".

At the same time when the scale mark 72b is switched, the cam follower protrusion 41b of the cam mechanism 45 moves and climbs over the cam protrusion 46a on the cam surface 46, and the gear portion 47b of the clutch mechanism 47 is meshed with the mesh portion 47a again, so that the scale body 70 and the handle 32 are fixed to each other around the axis L. As a result, the scale body 70 and the handle 32 rotate together again.

As described above, in the flow rate control valve 10 according to the present embodiment, the handle 32 formed in a shape of a one end closed tube, the scale body 70, the clutch mechanism 47 for switching the scale body 70, and the spacer 50 are coaxially arranged on the axis L1. This makes it possible to make the flow rate control valve 10 more compact because, for example, the dimension of the first body 12 in the radial direction can be reduced as compared with existing ones in which the central axis J of the scale body 70 is offset from the axis L1 in the radial direction.

Figure 22:
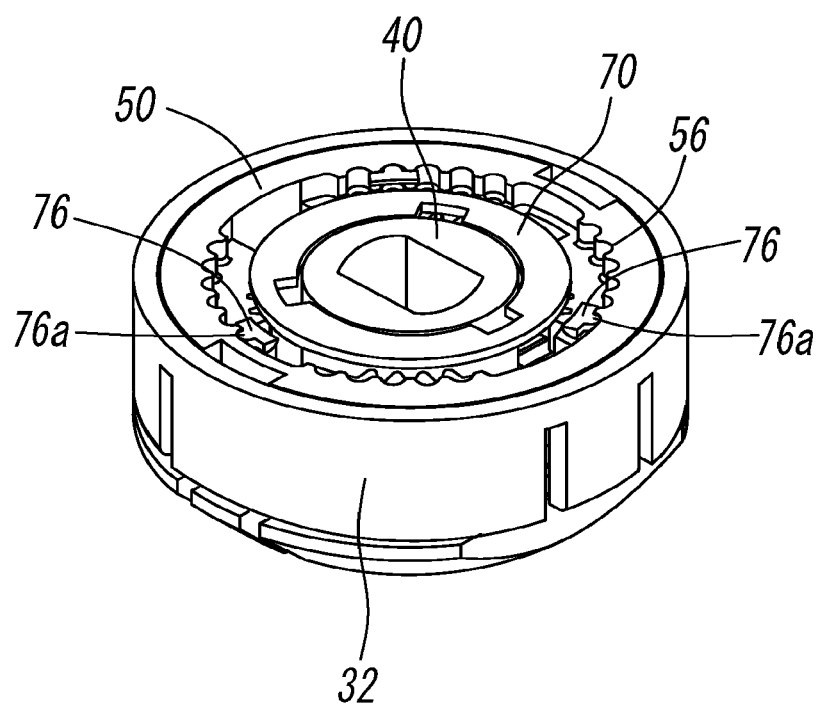
FIG. 22 is a cross-sectional view of a main part of a spacer according to a modification.

FIG. 17 illustrates a modification of the spacer 50 of the flow rate control valve 10 described above. According to the above-described embodiment, as illustrated in FIGS. 10 and 13, the scale body 70 is provided with the arm portion 76 having the locking protrusion 76a. In this case, since the locking protrusion 76a is formed in a hemispherical shape, the contact width of the locking protrusion 76a in contact with the inner surface of the spacer 50 is relatively small and, thus, the generated resistance is small. Therefore, as illustrated in FIG. 22, a hemispherically concaved recess 56 may be provided on the inner peripheral surface of the spacer 50 that the locking protrusion 76a faces. In this case, the plurality of recesses 56 are continuously provided in the circumferential direction and are formed in a wavy shape. Therefore, when a rotating force acts on the scale body 70, the arm portions 76 need to be elastically deformed radially inward to cause the locking protrusions 76a inserted into the recesses 56 to escape from the recesses 56. For this reason, the resistive force in the rotation direction of the scale body 70 can be further increased. Thus, when the scale mark 72b indicated by the scale indicator 34 is switched by the clutch mechanism 47, rotation of the scale body 70 can be more reliably prevented.

While the above-described modification has been described with reference to the arm portion 76 having the locking protrusion 76a and the inner surface of the spacer 50 having the recesses 56 thereon, a modification is not limited thereto. The arm portion 76 may have the recesses 56, and the inner surface of the spacer 50 may have, thereon, a plurality of locking protrusions 76a that are provided in the circumferential direction and that are engageable with the recesses 56.

Furthermore, while the above embodiment has been described with reference to the scale indicator 34 for indicating the scale mark 72b being the scale indicating opening formed in the top panel 32b of the handle 32, the scale indicator is not limited thereto. The scale indicator 34 may be, for example, an arrow or the like. In addition, the digit on the scale mark 72b need not represent the number of times the handle has been rotated 360 degrees as in the present embodiment. For example, the degree of opening of the needle valve 27 may be divided equally into integer numbers, and a digit may represent the rotation operation amount of the handle corresponding to each of the degrees of opening of the needle valve 27.

Furthermore, while the above embodiment has been described with reference to the cam mechanism 45 serving as the axial direction driving means for causing the shaft portion 40 to operate in the axis L1 direction, the present invention is not limited thereto, and various driving means can be employed.

REFERENCE SIGNS LIST 10 flow rate control valve
12 first body (body)
12a valve accommodating portion
12b port forming portion
13 second body
14 first port
15 second port
16 fluid flow path
16a first flow path
16b second flow path (flow path)
16c internal flow path
17 pipe joint
17a locking piece
17b release bush
18, 30 male thread
19 communication flow path
19a connection flow path
19b port flow path
20 check valve holder
20a, 56 recess
21 needle valve holder
21a valve hole
21b fixing hole
21b1 first fixing surface portion
21b2 second fixing surface portion
21c peripheral wall
22 central hole
23 seal member
25 check valve
26 seat portion
27 needle valve 27a throttle portion
27b needle main body portion
27c cutout surface
28 valve seal
29 throttle hole
31 needle guide
31a female thread
31b, 43 through-hole
32 handle
32a engagement projection
32b top panel
32c side panel
32d engagement protrusion
32e engagement claw portion
33, 51a locking protrusion
34 scale indicator (scale indicating opening)
40 shaft portion
41 first shaft portion
41a biasing flange portion
41b cam follower protrusion
42 second shaft portion
43a, 51b, 72a flat portion
43b curved portion
45 cam mechanism
46 cam surface
46a cam protrusion
46b cam flat portion
47 clutch mechanism
47a mesh portion (engaging portion)
47a' mesh piece
47b gear portion (engaged portion)
47b' gear piece
48 clutch drive mechanism
50 spacer
51 locking claw portion
51c inner surface
52 through-hole
52a inner peripheral surface (resistive force generating surface)
53 annular protruded rim portion
54 stepped portion
55 locking recess
57 circumferential fixing portion
57a fixed pieces
57b first surface portion
57c second surface portion
58 opening
59 leg
59a locking protrusion
60 bush
62 coil spring (spring portion)
64 spring seat
70 scale body
71 ring main body portion
72 dial plate
72b scale mark
73 collar portion
74 ring hole
75 spring seat bearing
76 arm portion (contact portion)
76a locking protrusion (contact portion)
77 contact portion
J central axis
L1 first axis
L2 second axis
Pr locked position

The invention claimed is:

1. A flow rate control valve comprising:
a body extending in an axial direction;
a flow path formed in the body;
a handle provided on one side of the body in the axial direction, wherein the handle is supported by the body in a rotatable manner about the axis relative to the body; and
a needle valve disposed in the body coaxially with the handle, wherein the needle valve adjusts an opening degree of the flow path by moving in the axial direction in accordance with a rotation operation amount of the handle,
wherein the flow rate control valve is capable of controlling a flow rate of fluid flowing through the flow path in accordance with the rotation operation amount of the handle,
wherein the flow rate control valve further comprises:
a scale body supported in a rotatable manner about the axis and having, marked thereon, scale marks each indicating the rotation operation amount of the handle;
a scale indicator configured to rotate about the axis always together with the handle and indicate one of the scale marks corresponding to the rotation operation amount of the handle; and
a clutch mechanism configured to switch between the scale marks of the scale body indicated by the scale indicator by transmitting rotation of the handle to the scale body or blocking the transmission each time the handle is rotated at a predetermined angle,
wherein the clutch mechanism includes an engaging portion and an engaged portion configured to transmit the rotation of the handle to the scale body by engaging with each other so as to rotate the scale indicator and the scale body together about the axis and a clutch drive mechanism configured to disengage the engaging portion from the engaged portion each time the handle is rotated at a predetermined angle so as to enable the scale indicator to rotate about the axis relative to the scale body due to the rotation of the handle and reengage the engaging portion with the engaged portion due to the rotation of the scale indicator relative to the scale body after the scale mark of the scale body indicated by the scale indicator is switched.

2. The flow rate control valve according to claim 1, wherein the clutch drive mechanism includes a cam surface fixedly provided on the body so as to extend annularly about the axis and a cam follower protrusion disposed facing the cam surface so as to rotate about the axis and slide on the cam surface with the rotation of the handle,
wherein the cam surface includes a cam protrusion protruding toward the one side of the axial direction and a cam flat portion extending in a flat shape from a bottom of the cam protrusion while facing the one side of the axial direction,
wherein the cam follower protrusion and the engaged portion are supported in a rotatable manner and a movable manner in the axial direction always integrally,
wherein the engaging portion is fixedly supported with respect to the body, and
wherein the clutch drive mechanism disengages the engaging portion from the engaged portion by sliding the cam follower protrusion on the cam protrusion and moving the engaged portion relative to the engaging portion toward the one side of the axial direction each time the handle is rotated at a predetermined angle so as to enable the scale indicator to rotate about the axis relative to the scale body due to the rotation of the handle.

3. The flow rate control valve according to claim 2, wherein the clutch drive mechanism includes a spring portion configured to always urge the cam follower protrusion and the engaged portion toward the other side of the axial direction opposite the one side of the axial direction, and wherein after the scale mark of the scale body indicated by the scale indicator is switched, the clutch drive mechanism moves the cam follower protrusion toward the other side of the axial direction through the urging of the spring portion so that the cam follower protrusion is brought into contact with the cam flat portion and reengages the engaged portion with the engaging portion.

4. The flow rate control valve according to claim 3, further comprising:

a resistive force generating surface fixedly provided on the body so as to extend annularly about the axis, wherein the scale body includes a contact portion in slidable contact with the resistive force generating surface, and wherein when the engaged portion is disengaged from the engaging portion, corotation of the scale body due to the rotation of the handle is prevented by a resistive force generated by the contact portion in contact with the resistive force generating surface.

5. The flow rate control valve according to claim 2, further comprising:

a resistive force generating surface fixedly provided on the body so as to extend annularly about the axis, wherein the scale body includes a contact portion in slidable contact with the resistive force generating surface, and wherein when the engaged portion is disengaged from the engaging portion, corotation of the scale body due to the rotation of the handle is prevented by a resistive force generated by the contact portion in contact with the resistive force generating surface.

6. The flow rate control valve according to claim 5, wherein the contact portion includes a locking protrusion protruding outward in a radial direction of the locking protrusion, and wherein the resistive force generating surface has, formed thereon, a plurality of recesses that concave outward in the radial direction at equal intervals around the axis.

7. The flow rate control valve according to claim 1, wherein the scale indicator is a scale indicating opening that is open in the handle, and wherein the scale marks marked on the scale body are visible from an outside through the scale indicating opening.

* * * * *